(12) United States Patent
Chen et al.

(10) Patent No.: US 8,666,401 B2
(45) Date of Patent: Mar. 4, 2014

(54) METHOD AND SYSTEM FOR SELECTING CANDIDATE NEIGHBORING CELLS

(75) Inventors: Xiaowei Chen, Shenzhen (CN); Lei Su, Shenzhen (CN); Wanbin Qiu, Shenzhen (CN); Dongmei He, Shenzhen (CN); Hao Zheng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/515,195

(22) PCT Filed: Apr. 29, 2011

(86) PCT No.: PCT/CN2011/073537
§ 371 (c)(1),
(2), (4) Date: Jun. 11, 2012

(87) PCT Pub. No.: WO2011/157083
PCT Pub. Date: Dec. 22, 2011

(65) Prior Publication Data
US 2013/0084857 A1  Apr. 4, 2013

(30) Foreign Application Priority Data

Jun. 13, 2010  (CN) .......................... 2010 1 0207606

(51) Int. Cl.
- *H04W 48/16* (2009.01)
- *H04W 24/02* (2009.01)
- *H04W 36/00* (2009.01)

(52) U.S. Cl.
CPC .......... *H04W 24/02* (2013.01); *H04W 36/0083* (2013.01)

USPC ........ 455/434; 455/437; 455/443; 455/435.1; 455/525

(58) Field of Classification Search
CPC ........................ H04W 24/02; H04W 36/0083
USPC ...................... 455/434, 437, 443, 435.1, 525
See application file for complete search history.

(56) References Cited

U.S. PATENT DOCUMENTS

| | | | |
|---|---|---|---|
| 2004/0063428 A1 | 4/2004 | Jansson | |
| 2008/0096581 A1* | 4/2008 | Do et al. | 455/456.2 |

(Continued)

FOREIGN PATENT DOCUMENTS

| | | |
|---|---|---|
| CN | 101115310 A | 1/2008 |
| CN | 101540987 A | 9/2009 |

OTHER PUBLICATIONS

International Search Report for PCT/CN2011/073537 dated Jun. 12, 2011.

*Primary Examiner* — Barry Taylor
(74) *Attorney, Agent, or Firm* — Ling Wu; Stephen Yang; Ling and Yang Intellectual Property

(57) ABSTRACT

Disclosed is a method and system for selecting a candidate neighbor cell in the present invention. The method includes: determining a candidate cell set of a serving cell; acquiring a base station closest to the serving cell from the candidate cell set, and adding all the cells under the base station into a neighbor cell set; deleting a cell sheltered by the base station and cells included in the neighbor cell set from the candidate cell set; judging whether the candidate cell set is empty; if not, then returning to the step of acquiring a base station closest to the serving cell; and if yes, then taking cells in the neighbor cell set as a first layer of neighbor cells of the serving cell.

16 Claims, 5 Drawing Sheets

(56) References Cited

U.S. PATENT DOCUMENTS

2008/0119191 A1    5/2008  Feigen et al.
2008/0227455 A1*   9/2008  Kim .............................. 455/436
2011/0084881 A1*   4/2011  Fischer ......................... 342/451
2012/0064900 A1*   3/2012  Thadasina et al. ............ 455/446

* cited by examiner

METHOD AND SYSTEM FOR SELECTING CANDIDATE NEIGHBORING CELLS

TECHNICAL FIELD

The present invention relates to the neighbor cell selection technology, and particularly, to a method and system for selecting a candidate neighbor cell.

BACKGROUND OF THE RELATED ART

Neighbor cell planning is an important job at the beginning stage of network planning, and the quality of neighbor cell planning will directly affect the handover success rate and drop rate of the user ender (UE), and whether the neighbor cell configuration is rational is a key factor affecting the network stability. If the neighbor cell configuration is irrational, it may still cause the failure of handover of the terminal and even cause call drop. If the neighbor cell planning is well done, not only the performance of the wireless network will be stable but also the costs for subsequently optimizing the neighbor cell can be effectively reduced.

Generally, a plurality of layers of neighbor cells will be configured under certain special situations when planning the neighbor cell, therefore, when handover cannot be carried out due to busy telephone traffic of the internal neighbor cell or some other factors, the system can decide to switch to another layer of neighbor cell, thereby reducing the call drop caused by untimely handover.

Currently, most configurations of neighbor cell are done by the method of setting a threshold and unifiedly planning the cells meeting the condition as neighbor cells, and there are mainly the following methods:

1. the neighbor cell relationship is determined according to the cell coverage determined on the basis of distance between cells and cell direction angle. Although this method meets that the cell closer to the serving cell is configured as a neighbor cell, the local distribution density of the cell is not taken into account, even if there are a plurality of cells within a certain area closer to the cell, they will be configured as neighbor cells, which will waste resources, and for base stations distributed sparsely, there are few configured neighbor cells, which will affect the network coverage and handover effect of certain areas.

2. The neighbor cell configuration is done by calculating the pilot signal strength and coverage area proportion of the cell. This method is also limited, and it is only applicable to the neighbor cell planning in the same frequency instead of neighbor cells in different frequencies, moreover, the pilot signal strength data of the cell needs to be obtained by way of drive test, which costs a large amount of time at the beginning stage of network planning, and the drive test data before the startup of the station and the data under real network situation after the startup of the station are quite different, which will cause the neighbor cell configuration to be inaccurate.

3. The path loss of each cell is calculated at first, and then neighbor cell planning is carried out according to the neighbor cell configuration threshold. This method also lacks the consideration regarding the real distribution situation of the cell and whether there are any cells being sheltered and so on.

SUMMARY OF THE INVENTION

In order to solve the existing problem that the methods for planning neighbor cells are limited, the efficiency is low and the accuracy is poor, the present invention provides a method and system for selecting a candidate neighbor cell, and the technical solution is as follows:

a method for selecting a candidate neighbor cell comprises:
determining a candidate cell set of a serving cell;
acquiring a base station closest to the serving cell from the candidate cell set, and adding all cells under the base station into a neighbor cell set;
deleting a cell sheltered by the base station and cells which are included in the neighbor cell set in the candidate cell set;
judging whether the candidate cell set is empty; if not, then returning to the step of acquiring a base station closest to the serving cell;
if yes, then taking cells in the neighbor cell set as a first layer of neighbor cells of the serving cell.

Furthermore, the step of adding all cells in the base station into a neighbor cell set further comprises: adding a cell whose distance from the base station is less than a same layer distance threshold into the neighbor cell set.

Furthermore, the step of adding a cell whose distance from the base station is less than a same layer distance threshold into the neighbor cell set comprises:
taking the base station as a center, drawing one circle by taking the same layer distance threshold as a radius, and adding all cells within a circular area into the neighbor cell set.

Furthermore, the cell sheltered by the base station is:
taking the serving cell as a starting point, drawing two half-lines by taking a connection line between the serving cell and the base station as a center line, a cell within a range between said two half-lines being the cell sheltered by the base station, and an included angle between each half-line and the center line being $\beta$.

Furthermore, the method further comprises: judging whether the number of cells in the first layer of neighbor cells is less than the maximum allowable number of neighbor cells, if yes, adding the sheltered cell into a second candidate cell set, and returning to the step of acquiring a base station closest to the serving cell until the second candidate cell set is empty, and taking obtained cells in the neighbor cell set as a second layer of neighbor cells of the serving cell.

A system for selecting a candidate neighbor cell, comprising:
a determination module for determining a candidate cell set of a serving cell;
an acquisition and addition module for acquiring a base station closest to the serving cell from the candidate cell set, and adding all cells under the base station into a neighbor cell set;
a deletion module for deleting a cell sheltered by the base station and cells which are included in the neighbor cell set in the candidate cell set;
a judgment module for judging whether the candidate cell set is empty; if not, then triggering the acquisition and addition module until the candidate cell set is empty; and
an acquisition module for when a judgment result of the judgment module is empty, taking cells in the neighbor cell set as a first layer of neighbor cells of the serving cell.

Furthermore, the acquisition and addition module is further used for adding a cell whose distance from the base station is less than a same layer distance threshold into the neighbor cell set.

Furthermore, the acquisition and addition module is specifically used for taking the base station as a center, drawing a circle by taking the same layer distance threshold as a radius, and adding all cells within a circular area into the neighbor cell set.

Furthermore, the cell sheltered by the base station is: taking the serving cell as a starting point, drawing two half-lines by taking a connection line between the serving cell and the base station as a center line, a cell within a range between said two half-lines being a cell sheltered by the base station, and the included angle between each half-line and the center line being $\beta$.

Furthermore, the judgment module is further used for judging whether the number of cells in the first layer of neighbor cells is less than the maximum allowable number of neighbor cells, if yes, adding the sheltered cell into a second candidate cell set, and triggering the acquisition and addition module until the second candidate cell set is empty, and taking obtained cells in the neighbor cell set as a second layer of neighbor cells of the serving cell.

By way of the following technical solution: determining a candidate cell set of a serving cell; acquiring a base station closest to the serving cell from the candidate cell set, and adding all the cells under the base station into a neighbor cell set; deleting a cell sheltered by the base station and cells which are included in the neighbor cell set in the candidate cell set; judging whether the candidate cell set is empty; if not, repeating the step of acquiring a base station closest to the serving cell and adding all the cells under the base station into the neighbor cell set and the step of deleting a cell sheltered by the base station and cells which are included in the neighbor cell set in the candidate cell set; and if yes, taking cells in the neighbor cell set as a first layer of neighbor cells of the serving cell, the efficiency and accuracy of planning neighbor cells can be improved, saving neighbor cell resources, and improving the self-adaptability of the candidate neighbor cell.

PREFERRED EMBODIMENTS OF THE PRESENT INVENTION

In order to make the technical problem to be solved by the present invention, the technical solution and beneficial effects clearer and understandable, the present invention will be further described in detail in conjunction with the accompanying drawings and embodiments hereinafter. It should be understood that the particular embodiments described herein are merely used for explaining the present invention but not limiting the present invention.

Figure 1:
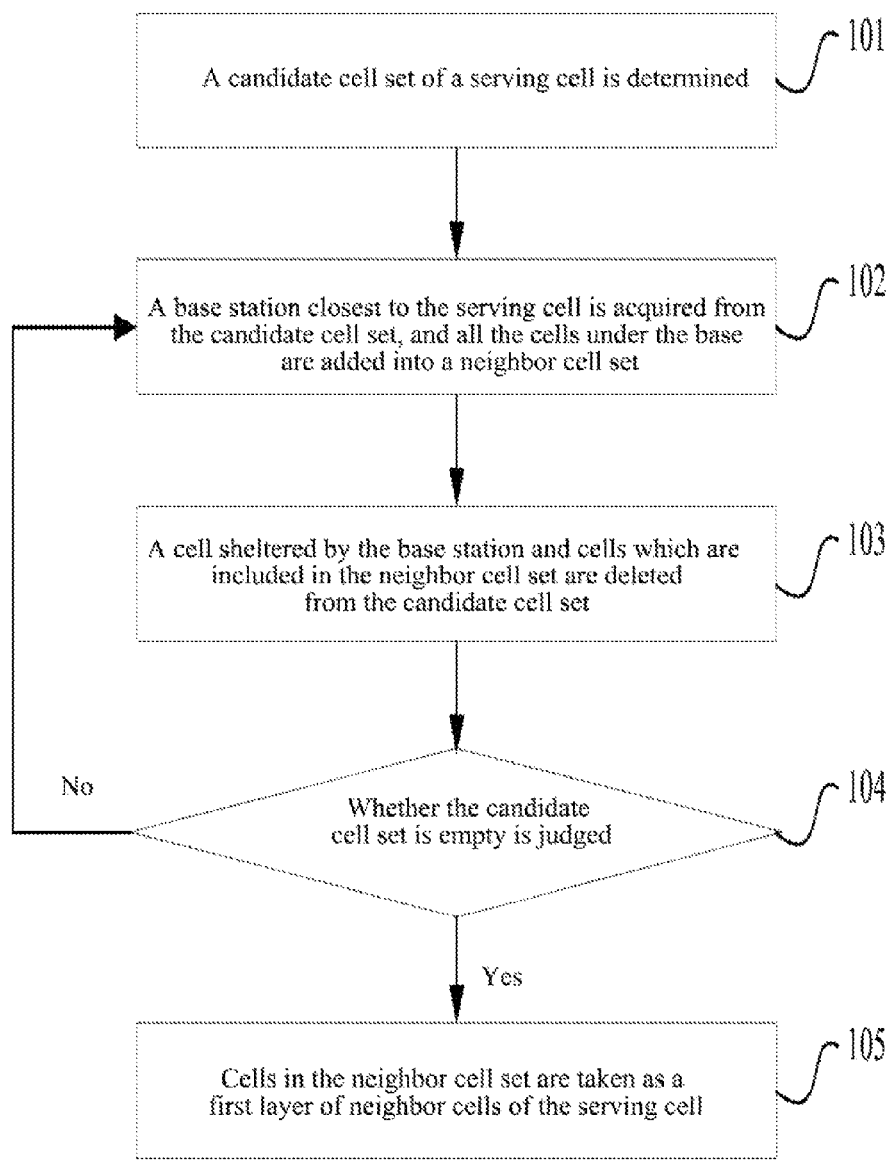
FIG. 1 is a flowchart of a method for selecting a candidate neighbor cell provided by the present invention.

The present invention provides a method for selecting a candidate neighbor cell, and as shown in FIG. 1, the method comprises:

in step 101, a candidate cell set of a serving cell is determined;

in step 102, a base station closest to the serving cell is acquired from the candidate cell set, and all the cells under the base station are added into a neighbor cell set;

in step 103, a cell sheltered by the base station and cells which are included in the neighbor cell set in the candidate cell set are deleted;

in step 104, whether the candidate cell set is empty is judged, if not, then return to step 102; and in step 105, if yes, then cells in the neighbor cell set are taken as a first layer of neighbor cells of the serving cell.

Furthermore, step 102 further comprises: adding a cell whose distance from the base station is less than a same layer distance threshold into the neighbor cell set.

Furthermore, the step of adding a cell whose distance from the base station is less than a same layer distance threshold into the neighbor cell set comprises:

taking the base station as the center, drawing a circle by taking the same layer distance threshold as the radius, and adding all the cells in the circular area into the neighbor cell set.

Furthermore, the cell sheltered by the base station is: taking the serving cell as the starting point, drawing two half-lines by taking the connection line between the serving cell and the base station as the center line, a cell within the range between the two half-lines being a cell sheltered by the base station, and the included angle between each half-line and the center line being $\beta$.

Furthermore, the method further comprises: judging whether the number of cells in the first layer of neighbor cells is less than the maximum allowable number of neighbor cells, if yes, then adding the sheltered cell into a second candidate cell set, and returning to step 102 until the second candidate cell set is empty, and taking obtained cells in the neighbor cell set as a second layer of neighbor cells of the serving cell. The selection of the third layer and nth layer of neighbor cell is similar.

Hereinafter, the determination of a first layer of neighbor cells will be taken as an example for description, and some parameters involved in the present invention will be described first:

1) serving cell A;

2) candidate cell set S of A, and the meaning of candidate cell set S is to select some cells surrounding the serving cell A, and the neighbor cells of the serving cell A are obtained from the set, which can greatly reduce the complexity of calculation;

3) neighbor cell set U, wherein the initial value of U can be an empty set or may not be an empty set;

4) sheltered cell set V, wherein the initial value of V is an empty set, and it is defined that the sheltered cell set V is used for selecting the next layer of neighbor cell;

5) maximum distance RMax of neighbor cell, wherein RMax can be 30 km;

6) same layer distance threshold SameDis, wherein the preferred value of same layer distance threshold is a value from 200 m to 300 m, but it can also be less than 200 m or greater than 300 m, which depends on the specific demand;

7) shelter angle $\beta$.

Figure 2:
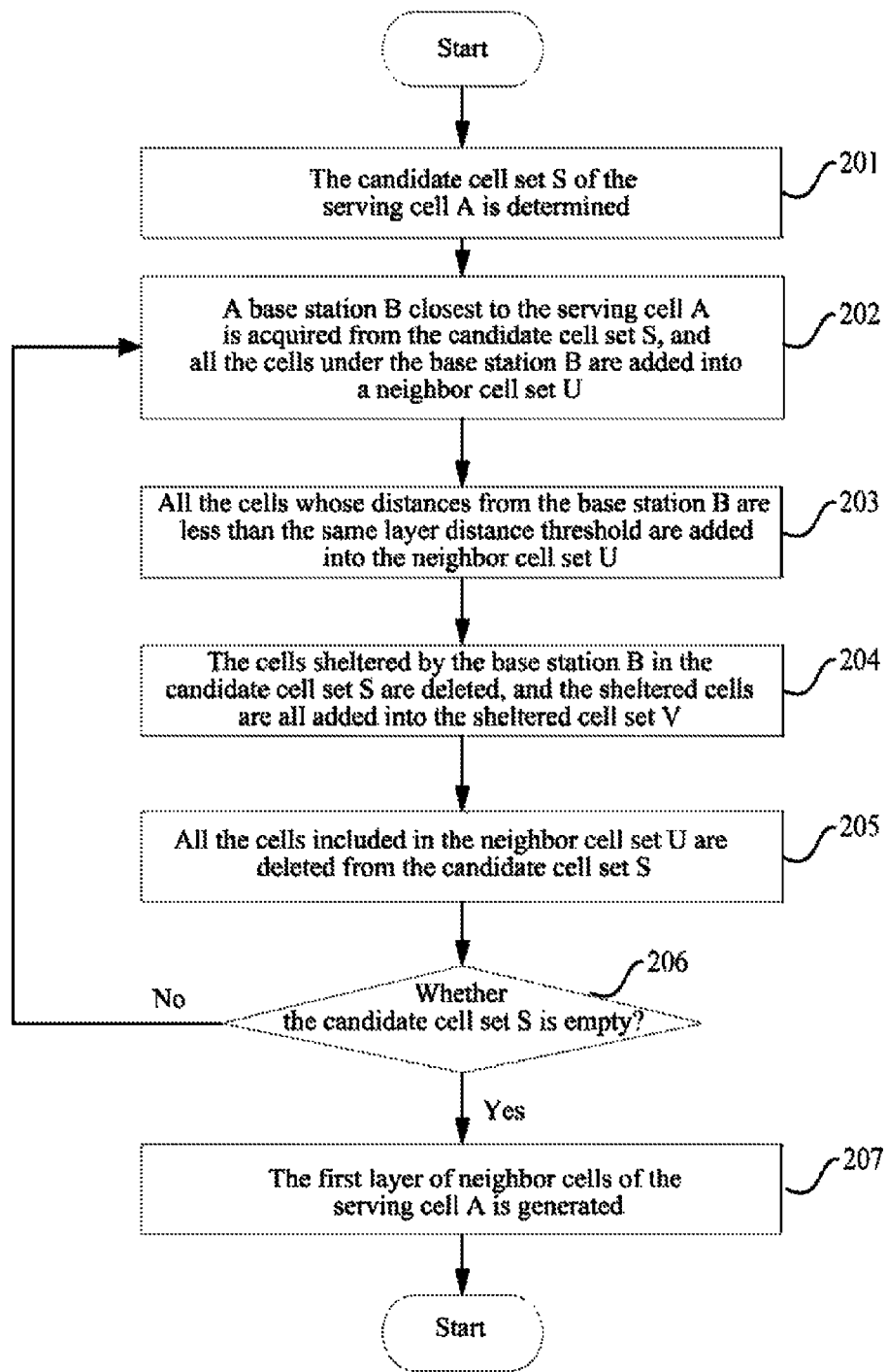
FIG. 2 is a flowchart of a method for selecting a candidate neighbor cell provided by the present invention.

In particular, as shown in FIG. 2, the method for selecting a candidate neighbor cell comprises:

in step 201, the candidate cell set S of the serving cell A is determined.

Figure 3:
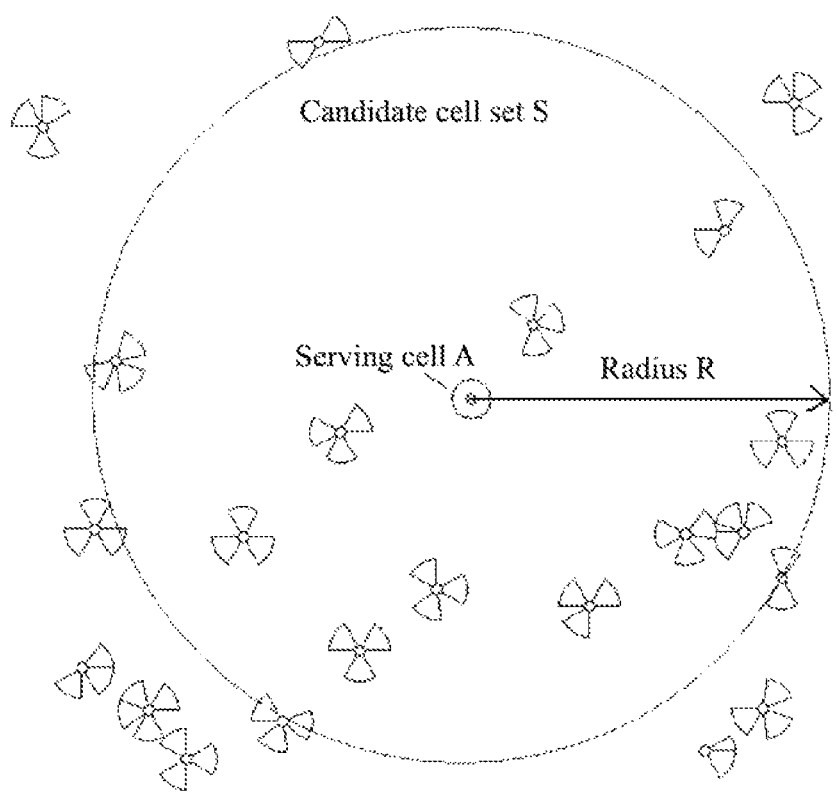
FIG. 3 is a schematic diagram of acquiring a candidate cell set in omnidirectional cells provided by the present invention.
Figure 4:
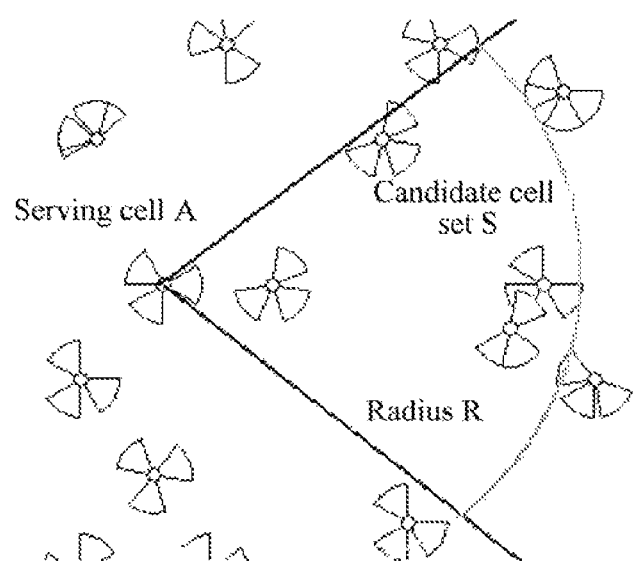
FIG. 4 is a schematic diagram of acquiring a candidate cell set in directional cells provided by the present invention.

In order to reduce unnecessary calculation, those cells far away from the serving cell A can be excluded according to the distance between cells, and the remaining is taken as the candidate cell set S. The selection of candidate cell set can be decided according to the type of the serving cell A:

1) if A is an omnidirectional cell, the candidate cell set S includes all the cells in a circular area with the serving cell A being the center and R being the radius, and the radius R of the circle doesn't exceed the neighbor cell maximum distance RMax. As shown in FIG. 3, other cells except A in the circular area are the candidate cell set S of A;

2) if A is a directional cell, the candidate cell set S includes all the cells in a fan area with the serving cell A being the center and R being the radius, and the radius R of the fan doesn't exceed the neighbor cell maximum distance RMax. As shown in FIG. 4, other cells except A in the fan area are the candidate cell set S of A.

It needs to be noted that generally the number of cells in the candidate cell set S is more than the maximum number of neighbor cells. The selection algorithm of the candidate cell set S can be: first setting one initial radius R, calculating whether the number of cells within the range meets the requirements, if not, then enlarging the radius R until the number meets the requirement or R is greater than the neighbor cell maximum distance RMax.

In step 202, a base station B closest to the serving cell A is acquired from the candidate cell set S, and all the cells under the base station B are added into a neighbor cell set U.

In particular, the base stations in the candidate cell set S are ranked from low to high according to the distance from the serving cell A, and the base station B closest to the serving cell A is found in the candidate cell set S, and all the cells under the base station B are added into the neighbor cell set U.

In step 203, all the cells whose distances from the base station B are less than the same layer distance threshold are added into the neighbor cell set U.

Figure 5:
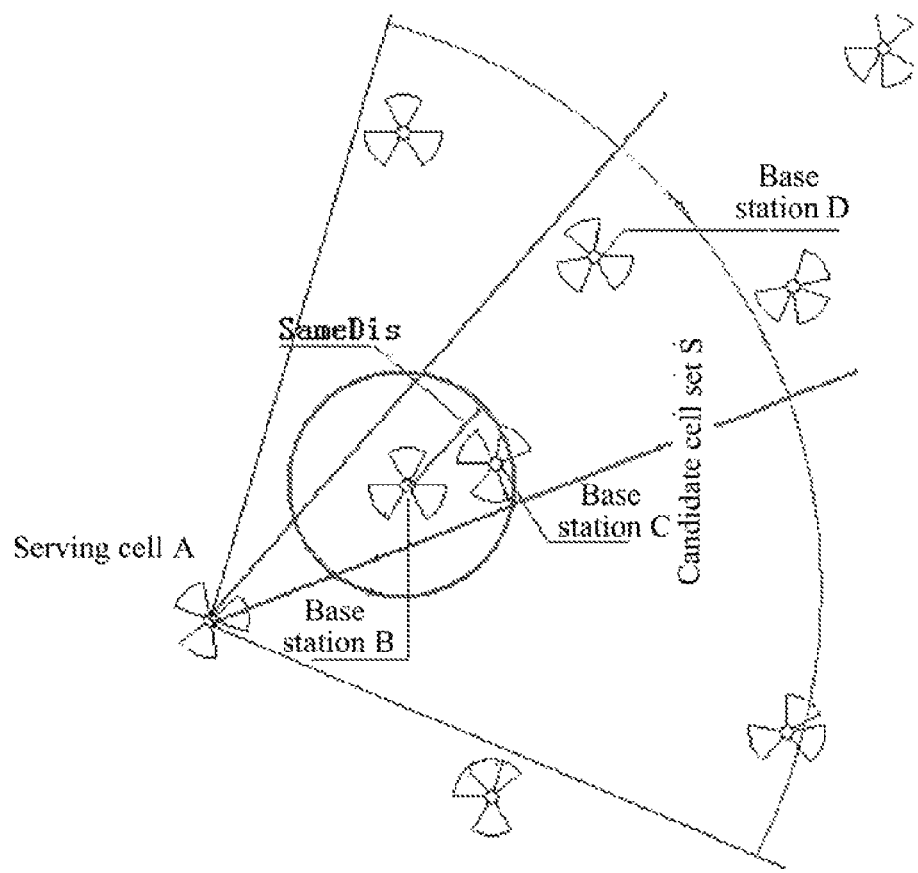
FIG. 5 is a schematic diagram of acquiring a neighbor cell set provided by the present invention.

As shown in FIG. 5, other cells except A in the fan area are the candidate cell set S of A, and one circle is drawn by taking the base station B as the center and taking the same layer distance threshold SameDis as the radius, and all the cells in this circular area (such as cells under base station C) are also added into the neighbor cell set U of A. The same layer distance threshold SameDis is an empirical value which can be set according to different network distribution situations.

The reason why the cells whose distances from the base station B are less than SameDis are added into the neighbor cell set U is that the handover continuity during the high speed movement of the user equipment (UE) has to be taken into account, assuming that only the cells of the base station B are configured as the neighbor cell of the serving cell A, during the high speed movement of UE, once it is not timely switched to the cell under the base station B, handover dropping may be caused; if the cells under the base station C closer to the base station B are also configured as the neighbor cells of A, even if the UE is not switched to the cell under the base station B, it can also be switched to the cell under the base station C so as to prevent the occurrence of handover dropping.

In step 204, the cells sheltered by the base station B in the candidate cell set S are deleted, and the sheltered cells are all added into the sheltered cell set V.

The judgment principle of shelter is: the shelter area is that the serving cell A is taken as the starting point, two half-lines are drawn by taking the AB connection line as the center line, and the range between these two half-lines is the shelter area, and the included angle between each half-line and the AB connection line is β, the included angle β is an empirical value which can be set according to different situations, for example, it can be a numerical value such as 15 degree, 25 degree, etc.

Figure 6:
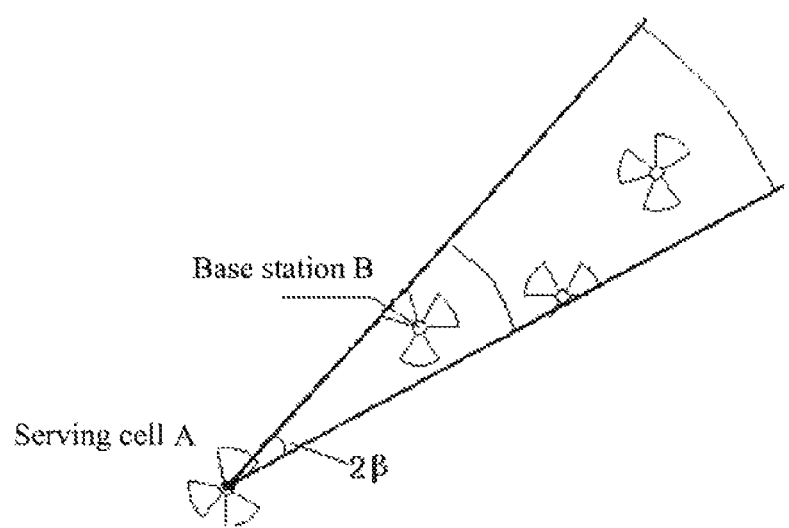
FIG. 6 is a schematic diagram of acquiring a sheltered cell provided by the present invention.

The circular area shown in FIG. 6 is an area sheltered by the base station B in the candidate cell set S, and if the cells under the base station B is determined as the neighbor cells of the serving cell A, then the handover and transit are carried out on the cells in the sheltered area of base station B by way of the cells of the base station B, and the cells sheltered by the base station B belong to a outer layer of neighbor cells, therefore, these cells needs to be deleted from the candidate cell set S.

It needs to be noted that if the cells whose distances from the base station B are less than the same layer distance threshold SameDis are within the shelter area at the same time, then these cells will not be deleted but will be placed into the neighbor cell set U, such as the cells under the base station C in FIG. 5. Only those cells not within the range of same layer distance threshold SameDis of the base station B but within the shelter area of the base station B will be deleted from the candidate cell set S, such as the cells under base station D in FIG. 5.

In step 205, all the cells included in the neighbor cell set U are deleted from the candidate cell set S.

The cells in the neighbor cell set U will constitute the neighbor cells of A, therefore, they will be deleted from the candidate cell set S so as to continue to sort out neighbor cells in the remaining set.

In step 206, whether the candidate cell set S is empty is judged, if not, then return to step 202 and continue to circularly select a cell and place it into the neighbor cell set U; and if the candidate cell set S is empty, then go to step 207.

In step 207, the first layer of neighbor cells of the serving cell A is generated, and the cells in the neighbor cell set U are the first layer of neighbor cells of the serving cell A.

The above examples are regarding a method for selecting a candidate neighbor cell of global system for mobile communication (GSM) neighbor cell automatic planning, in which the first layer of neighbor cells are first calculated, if the number of the first layer of neighbor cells is less than the maximum allowable number of neighbor cells, then the sheltered cell set V is taken as a second candidate cell set S, then steps 202 to 206 are performed repeatedly until the second candidate cell set S is empty, and at this moment, the obtained cells in the neighbor cell set U are taken as the second layer of neighbor cells of the serving cell A. And so on, when calculating the Nth layer of neighbor cells, the sheltered cell set V obtained when calculating the (N−1)th layer of neighbor cells is taken as the Nth candidate cell set S, and then steps 202 to 206 are performed repeatedly until the N candidate cell set S is empty, and at this moment the obtained cells in the neighbor cell set U are taken as the Nth layer of neighbor cells of the serving cell A. In actual situation, the requirement of neighbor cell planning can usually be done by calculating the second layer of neighbor cells. The technical solution of the present invention provides more choices for the network planning personnel so as to configure more rational neighbor cell relationship. In this case, the method in this example can also be applicable to other standards such as wideband code division multiple access (WCDMA), time division synchronous code division multiple access (TD-SCDMA) and so on.

Figure 7:
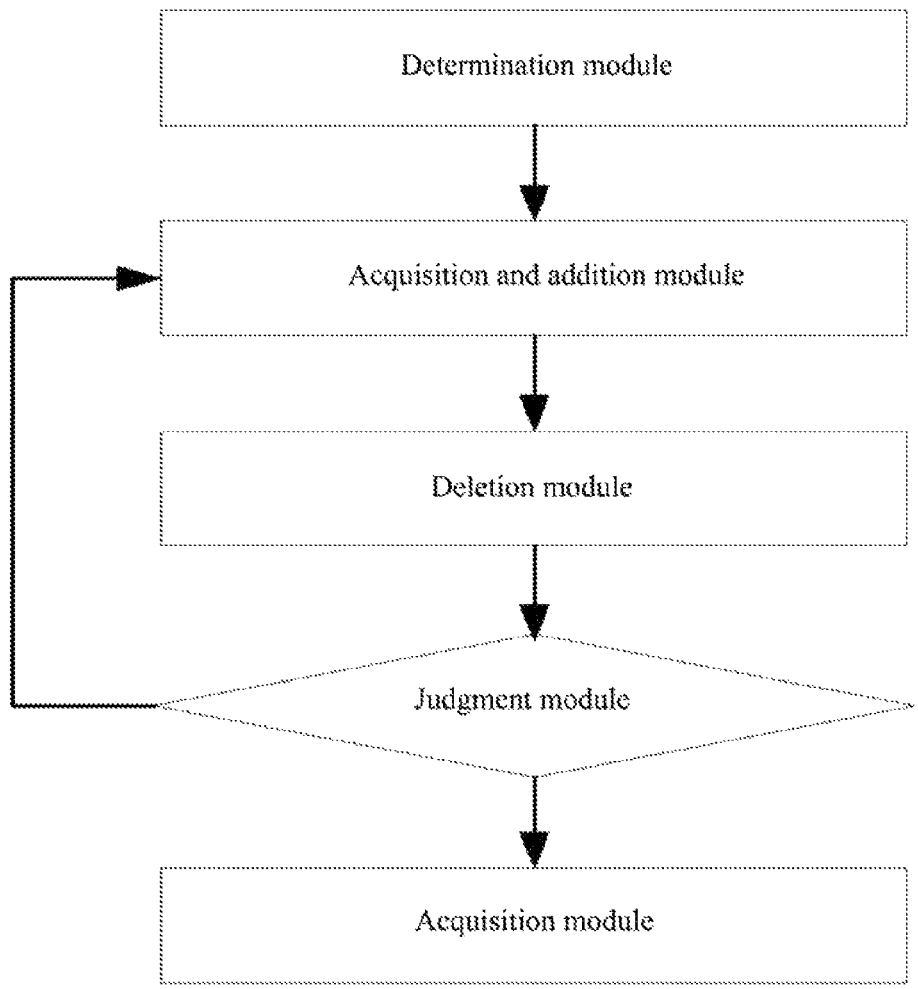
FIG. 7 is a structural diagram of a system for selecting a candidate neighbor cell provided by the present invention.

Based on the same invention concept as the method, the present invention provides a system for selecting a candidate neighbor cell, and as shown in FIG. 7, the system includes:

a determination module for determining a candidate cell set for a serving cell;

an acquisition and addition module for acquiring a base station closest to the serving cell from the candidate cell set, and adding all the cells under the base station into a neighbor cell set;

a deletion module for deleting a cell sheltered by the base station and those cells included in the neighbor cell set from the candidate cell set;

a judgment module for judging whether the candidate cell set is empty; if not, then triggering the acquisition and addition module until the candidate cell set is empty; and an acquisition module for when the judgment result of the judgment module is empty, taking a cell in the neighbor cell set as a first layer of neighbor cells of the serving cell.

Furthermore, the acquisition and addition module is further used for adding a cell whose distance from the base station is less than a same layer distance threshold into the neighbor cell set.

Furthermore, the acquisition and addition module is in particular used for taking the base station as the center, drawing one circle by taking the same layer distance threshold as the radius, and adding all the cells in the circular area into the neighbor cell set.

Furthermore, the cell sheltered by the base station is: taking the serving cell as the starting point, drawing two half-lines by taking the connection line between the serving cell and the base station as the center line, a cell within the range between the two half-lines being a cell sheltered by the base station, and the included angle between each half-line and the center line being $\beta$.

Furthermore, the judgment module is further used for judging whether the number of cells in the first layer of neighbor cells is less than the maximum allowable number of neighbor cells, if yes, then adding the sheltered cell into a second candidate cell set, and triggering the acquisition and addition module until the second candidate cell set is empty, and taking obtained cells in the neighbor cell set as a second layer of neighbor cells of the serving cell.

By way of the following technical solution: determining a candidate cell set of a serving cell; acquiring a base station closest to the serving cell from the candidate cell set, and adding all the cells under the base station into a neighbor cell set; deleting a cell sheltered by the base station and cells which are included in the neighbor cell set in the candidate cell set; judging whether the candidate cell set is empty; if not, repeating the step of acquiring a base station closest to the serving cell and adding all the cells under the base station into the neighbor cell set and the step of deleting a cell sheltered by the base station and cells which are included in the neighbor cell set in the candidate cell set; and if yes, taking cells in the neighbor cell set as a first layer of neighbor cells of the serving cell, the following beneficial effects can be achieved:

1) compared to manual neighbor cell planning, the efficiency and accuracy are greatly improved.

2) in the related art, the neighbor cell planning based on cell distance and direction angle fails to take the situation that the cell is sheltered into account, and it only configures the closer cells as neighbor cells roughly, which seriously wastes resources, however, the present invention fully takes the situation that the cell is sheltered into account, and those cells which need not be configured as neighbor cells are excluded from the neighbor cell set, thereby effectively saving the neighbor cell resources.

3) in the related art, the neighbor cell planning based on the pilot signal strength and coverage area proportion of cell needs pilot data and it is only applicable to neighbor cell planning in the same frequency, however, the present invention does not need the drive test but only need cell engineering parameters to complete the automatic layering of neighbor cell, thereby providing rational neighbor cell set with very high efficiency.

4) the candidate neighbor cell obtained by way of the present invention has self-adaptability to uneven networks.

What is described above is merely preferred embodiments of the present invention, and not intended to limit the protection scope of the present invention.

What is claimed is:

1. A method for selecting a candidate neighbor cell, comprising:
    determining a candidate cell set of a serving cell;
    acquiring a base station closest to the serving cell from the candidate cell set, and adding all cells under the base station into a neighbor cell set;
    deleting a cell sheltered by the base station and cells which are included in the neighbor cell set in the candidate cell set;
    judging whether the candidate cell set is empty; if not, then returning to the step of acquiring a base station closest to the serving cell;
    if yes, then taking cells in the neighbor cell set as a first layer of neighbor cells of the serving cell.

2. The method as claimed in claim 1, wherein the step of adding all cells in the base station into a neighbor cell set further comprises: adding a cell whose distance from the base station is less than a same layer distance threshold into the neighbor cell set.

3. The method as claimed in claim 2, wherein the step of adding a cell whose distance from the base station is less than a same layer distance threshold into the neighbor cell set comprises:
    taking the base station as a center, drawing one circle by taking the same layer distance threshold as a radius, and adding all cells within a circular area into the neighbor cell set.

4. The method as claimed in claim 3, further comprising: judging whether the number of cells in the first layer of neighbor cells is less than the maximum allowable number of neighbor cells, if yes, adding the sheltered cell into a second candidate cell set, and returning to the step of acquiring a base station closest to the serving cell until the second candidate cell set is empty, and taking obtained cells in the neighbor cell set as a second layer of neighbor cells of the serving service cell.

5. The method as claimed in claim 2, further comprising: judging whether the number of cells in the first layer of neighbor cells is less than the maximum allowable number of neighbor cells, if yes, adding the sheltered cell into a second candidate cell set, and returning to the step of acquiring a base station closest to the serving cell until the second candidate cell set is empty, and taking obtained cells in the neighbor cell set as a second layer of neighbor cells of the serving service cell.

6. The method as claimed in claim 1, wherein the cell sheltered by the base station is:
    taking the serving cell as a starting point, drawing two half-lines by taking a connection line between the serving cell and the base station as a center line, a cell within a range between said two half-lines being the cell sheltered by the base station, and an included angle between each half-line and the center line being $\beta$.

7. The method as claimed in claim 6, further comprising: judging whether the number of cells in the first layer of neighbor cells is less than the maximum allowable number of neighbor cells, if yes, adding the sheltered cell into a second candidate cell set, and returning to the step of acquiring a base station closest to the serving cell until the second candidate cell set is empty, and taking obtained cells in the neighbor cell set as a second layer of neighbor cells of the serving cell.

8. The method as claimed in claim 1, further comprising: judging whether the number of cells in the first layer of neighbor cells is less than the maximum allowable number of neighbor cells, if yes, adding the sheltered cell into a second candidate cell set, and returning to the step of acquiring a base station closest to the serving cell until the second candidate cell set is empty, and taking obtained cells in the neighbor cell set as a second layer of neighbor cells of the serving cell.

9. A system for selecting a candidate neighbor cell, comprising:
- a determination module configured to determine a candidate cell set of a serving cell;
- an acquisition and addition module configured to acquire a base station closest to the serving cell from the candidate cell set and add all cells under the base station into a neighbor cell set;
- a deletion module configured to delete a cell sheltered by the base station and cells which are included in the neighbor cell set in the candidate cell set;
- a judgment module configured to judge whether the candidate cell set is empty; if not, then triggering the acquisition and addition module until the candidate cell set is empty; and
- an acquisition module configured to, when a judgment result of the judgment module is empty, take cells in the neighbor cell set as a first layer of neighbor cells of the serving cell.

10. The system as claimed in claim 9, wherein the acquisition and addition module is further configured to add a cell whose distance from the base station is less than a same layer distance threshold into the neighbor cell set.

11. The system as claimed in claim 10, wherein the acquisition and addition module is specifically configured to take the base station as a center, draw one circle by taking the same layer distance threshold as a radius, and add all cells within a circular area into the neighbor cell set.

12. The system as claimed in claim 11, wherein the judgment module is further configured to judge whether the number of cells in the first layer of neighbor cells is less than the maximum allowable number of neighbor cells, and if yes, add the sheltered cell into a second candidate cell set, and trigger the acquisition and addition module until the second candidate cell set is empty, and take obtained cells in the neighbor cell set as a second layer of neighbor cells of the serving cell.

13. The system as claimed in claim 10, wherein the judgment module is further configured to judge whether the number of cells in the first layer of neighbor cells is less than the maximum allowable number of neighbor cells, and if yes, add the sheltered cell into a second candidate cell set, and trigger the acquisition and addition module until the second candidate cell set is empty, and take obtained cells in the neighbor cell set as a second layer of neighbor cells of the serving cell.

14. The system as claimed in claim 9, wherein the cell sheltered by the base station is: taking the serving cell as a starting point, drawing two half-lines by taking a connection line between the serving cell and the base station as a center line, a cell within a range between said two half-lines being the cell sheltered by the base station, and an included angle between each half-line and the center line being $\beta$.

15. The system as claimed in claim 14, wherein the judgment module is further configured to judge whether the number of cells in the first layer of neighbor cells is less than the maximum allowable number of neighbor cells, and if yes, add the sheltered cell into a second candidate cell set, and trigger the acquisition and addition module until the second candidate cell set is empty, and take obtained cells in the neighbor cell set as a second layer of neighbor cells of the serving cell.

16. The system as claimed in claim 9, wherein the judgment module is further configured to judge whether the number of cells in the first layer of neighbor cells is less than the maximum allowable number of neighbor cells, and if yes, add the sheltered cell into a second candidate cell set, and trigger the acquisition and addition module until the second candidate cell set is empty, and take obtained cells in the neighbor cell set as a second layer of neighbor cells of the serving cell.

* * * * *